United States Patent
De Kanter

[15] 3,675,501
[45] July 11, 1972

[54] DISPOSABLE THERMOMETER

[72] Inventor: Hendrik De Kanter, Santa Ana, Calif.

[73] Assignee: De Kanter-American Quality, Lake Arrowhead, Calif.

[22] Filed: March 19, 1971

[21] Appl. No.: 126,049

[52] U.S. Cl. .......................................... 73/358, 116/114.5
[51] Int. Cl. ................................................. G01k 11/08
[58] Field of Search............73/358; 99/192 TT; 116/114 Y, 116/114.5

[56] References Cited

UNITED STATES PATENTS

| | | | |
|---|---|---|---|
| 3,194,669 | 7/1965 | Koch | 73/358 |
| 3,465,590 | 9/1969 | Kluth | 73/358 |
| 3,597,976 | 8/1971 | Fryar | 73/358 |

*Primary Examiner*—Louis R. Prince
*Assistant Examiner*—Denis E. Corr
*Attorney*—Harris, Kiech, Russell & Kern

[57] ABSTRACT

A disposable thermometer comprising a series of separate sealed chambers. A temperature-sensitive material fills each chamber and each is adapted to change from a solid to a liquid state when exposed to heat above a different predetermined temperature. A quantity of magnetic metal particles is suspended in each temperature-sensitive material. The particles in each chamber initially are poled in a common direction along different, substantially parallel lines so as to rapidly repel each other and move from parallel alignment as the temperature-sensitive material in which they are suspended begins to change to a liquid state thereby providing an accurate and visual indication that the thermometer has been exposed to heat above the predetermined temperature associated with the temperature-sensitive material.

7 Claims, 4 Drawing Figures

PATENTED JUL 11 1972
3,675,501
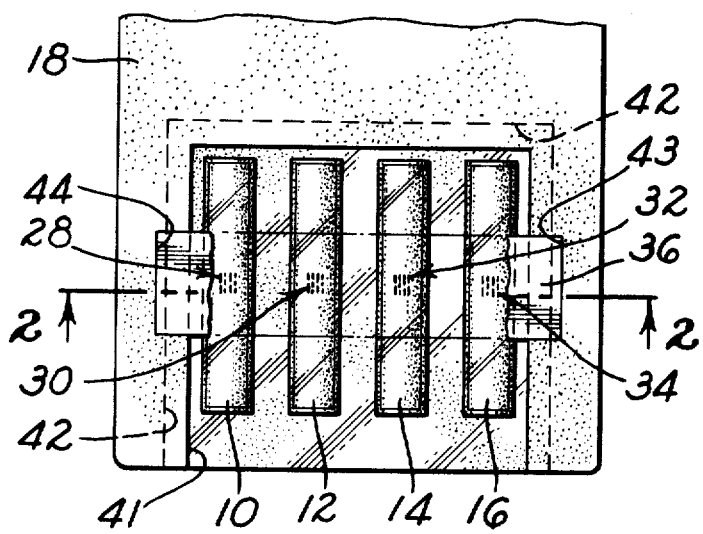
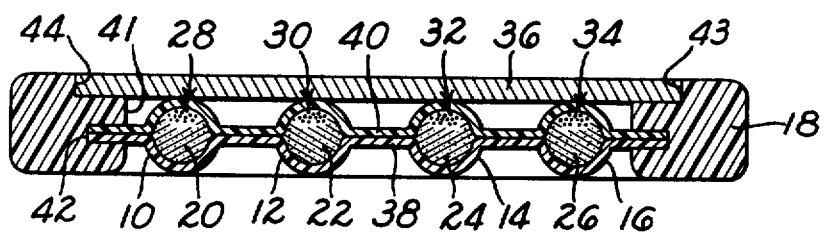
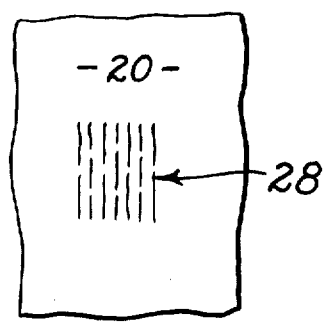
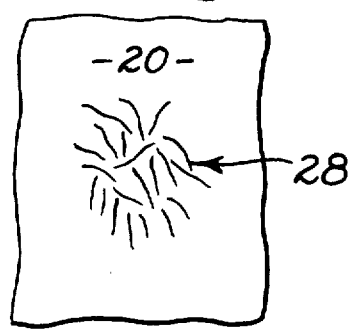
INVENTOR.
HENDRIK DE KANTER
BY HIS ATTORNEYS.
HARRIS, KIECH, RUSSELL & KERN

DISPOSABLE THERMOMETER

The present invention relates to thermometers and more particularly to an inexpensive yet highly accurate disposable thermometer for hospital use.

As hospital costs mount higher and higher, all avenues of economy are being explored. It has been found that a substantial saving may be achieved if inexpensive yet accurate disposable thermometers are utilized to take patients' temperatures rather than conventional glass thermometers which are relatively expensive, require sterilization after each use, and are subject to breakage. To this end, various disposable thermometers have been proposed. Unfortunately, to date such thermometers have not achieved the desired combination of low cost and accuracy of operation. Thermometers such as those disclosed in U. S. Pat. No. 3,175,401 are typical of such prior art having an accuracy of no better than plus or minus one degree.

In view of the foregoing, it is an object of the present invention to provide an improved disposable thermometer which is inexpensive yet rapid acting and accurate to plus or minus one-tenth of one degree.

Another object of the present invention is to provide a disposable thermometer of the foregoing character which is easy to fabricate and which may be reliably produced on a mass production basis.

A further object of the present invention is to provide a disposable thermometer of the foregoing character having a series of separate chambers each containing a different temperature-sensitive material adapted to change from a solid to a liquid state when exposed to heat above a different predetermined temperature and having suspended therein magnetized metal particles prealigned in substantially parallel lines and poled in a common direction.

Other objects and advantages of the present invention may be more clearly understood by reference to the following detailed description when considered with the drawing which, by way of example only, illustrates one form of disposable thermometer embodying the features of the present invention.

In the drawing:

FIG. 1 is a top view of a disposable thermometer;

FIG. 2 is a cross sectional view of the thermometer taken along the line 2—2 in FIG. 1;

FIG. 3 is a magnified view of a portion of one of the sealed chambers in the thermometer illustrated in FIG. 2, illustrating the general arrangement of the magnetized metal particles when the heat-sensitive material in the chamber is in a solid state prior to changing to a liquid state; and FIG. 4 is a magnified view similar to FIG. 3 showing the general arrangement of the magnetized metal particles after the heat-sensitive material has changed from a solid to a liquid state to indicate that the chamber has been exposed to heat above the predetermined melting temperature of the temperature-sensitive material.

Generally speaking, the disposable thermometer of the present invention comprises a series of separate, sealed chambers such as 10, 12, 14, and 16 carried in the forward end of a housing 18. The chambers each contain a different temperature-sensitive material 20, 22, 24, and 26 adapted to change from a solid to a liquid state at a different predetermined temperature. For example, the temperature-sensitive material 20 in chamber 10 may be adapted to change from a solid to a liquid state at 99° F. and the temperature-sensitive materials in the other chambers 12, 14, and 16 may be adapted to change from a solid to a liquid state at 99.5° F., 100° F., and 100.5° F., respectively. It is appreciated, of course, that a greater or lesser number of chambers may be included in the thermometer and that the particular melting points or temperatures at which the temperature-sensitive materials change from a solid to a liquid state are stated by way of example only.

Suspended in each temperature-sensitive material is a quantity of magnetized metal particles 28, 30, 32, and 34. Each particle contains a north and a south pole and the particles in each chamber are initially poled in a common direction along different substantially parallel lines (see FIG. 3). a magnet 36 releasably secured to the housing 18 is included to maintain such pre-alignment and is removed from the housing prior to use of the thermometer.

In use, the forward end of the housing 18 including the series of chambers is inserted into the mouth of the patient and under his tongue. As heat is transferred to the thermometer, it acts upon the temperature-sensitive materials contained in the various chambers. Depending upon the actual temperature to which the thermometer is exposed, various of the temperature-sensitive materials will begin to change from a solid to a liquid state as they are exposed to temperatures above their respective predetermined temperatures. As this occurs, the magnetized metal particles contained in such a liquefying temperature-sensitive material rapidly repel each other (the north and south poles of adjacent particles repelling each other) and move from parallel alignment (see FIG. 4). This provides a rapid and accurate visual indication that the thermometer has been exposed to heat above the predetermined temperature associated with the temperature-sensitive materials which have begun to liquefy. Thus, when the thermometer is removed from the patient's mouth, the nurse may rapidly determine the upper limit of the temperature of the patient by viewing the chambers and detecting the disarrangement of the metal particles in various of the chambers. For example, if the patient's temperature was 100° F., the metal particles in chambers 10, 12, and 14 would be disarranged, while the metal particles in chamber 16 would be in their original prealigned array. It bears noting that when the thermometer is removed from the patient's mouth, the temperature-sensitive materials will solidify, holding the metal particles in the array which they assumed when in the patient's mouth, thereby providing a semipermanent record of the patient's temperature.

Because of the simplicity of the thermometer of the present invention and its use of inexpensive materials, the cost of the thermometer is a fraction of the cost of that of the conventional glass thermometer. Also, the illustrated form of the invention is susceptible of rapid manufacture by mass production techniques. The cost of the thermometer to hospitals is therefore such that the thermometer may be utilized as a disposable thermometer. Further, since just as soon as the temperature-sensitive materials begin to liquefy, the magnetized particles contained therein rapidly move into disarray, the thermometer of the present invention is extremely rapid acting and accurate. In fact, the thermometer has proven to be accurate to within one-tenth of one degree. Accordingly, the thermometer of the present invention meets all requirements of hospitals for a low-cost, highly accurate, rapid-responding thermometer which may be disposed of after use.

Referring now more specifically to the drawings, and with particular reference to FIGS. 1 and 2, the series of sealed chambers 10, 12, 14, and 16 may be formed from two overlying sheets of plastic material of a nontoxic and transparent nature. The sheets are represented generally by the numerals 38 and 40 and are sealed along their marginal edges and at parallel spaced intervals to define the chambers. Thus arranged, the chambers are generally cylindrical and adapted to receive the temperature-sensitive materials with the magnetized metal particles suspended therein.

While various temperature-sensitive materials may be employed, certain characteristics are of some importance. It is important to the present invention that the temperature-sensitive material be substantially solid at room temperature and that it change from a solid to a liquid state rapidly at a predetermined and carefully controllable temperature. It is commonly known that waxes exhibit such desired characteristics and are therefore preferred in the present invention. A wax composition which has proven highly satisfactory in the present invention comprises a mixture of myristic acid $[CH_3(CH_2)_{12} CO_2H]$ and lauric acid $[CH_3(CH_2)_{10} CO_2H]$ in ratios ranging from 1:2.8 to 1:4.1 wherein the melting points of such mixtures may be accurately fixed from between 96.7° to 101° F. For example, a mixture of 1 part myristic acid to 2.8 parts lauric acid changes from a solid to a liquid state at 97.1° F. A wax formed from 1 part myristic acid and 3.2 parts lauric acid changes from a solid to a liquid state at 97.8° F. A wax formed of a mixture of 1 part myristic acid to 3.35 parts lauric acid melts at 98.8° F., while a wax having a melting point of 100.3° F. is formed from a mixture of 1 part myristic acid and 3.8 parts of lauric acid.

In the thermometer of the present invention, it is desired that the individual chambers contain temperature-sensitive materials having different melting points and, as previously stated, the melting points should increase in predetermined steps which may be noted on the body of the housing 18 adjacent the individual chambers.

The magnetized metal particles contained in the various chambers may be of various compositions and shape. Barium ferrite has proved highly satisfactory and exhibits the desired characteristics in that it may be premagnetized so that each particle contains a north and south pole and may be pre-arranged in closely grouped quantities with the individual particles being poled in a common direction along substantially parallel but different lines. By "poled in a common direction," it is meant that all of the north poles are on a first end of the particles and all of the south poles are on a second end.

Such pre-arrangement of the magnetized metal particles may be accomplished by various means. For example, in the assembly of the thermometer the metal particles may be mixed with the temperature-sensitive materials and introduced in controlled quantities into the various chambers which are then heat-sealed. The sealed chambers may then be heated and passed under a magnet to collect the particles in the predetermined array and to locate them adjacent an upper transparent face of the individual chambers upon cooling.

It is, of course, appreciated that in advance of actual usage, the thermometer may be exposed to temperatures well above normal room temperature, and, in fact, temperatures which may melt the temperature-sensitive materials. In such cases and to insure that the parallel alignment of the metal particles is not disturbed, the magnet 36 is fixed over the chambers until the thermometer is ready for use. Then the magnet is removed from the thermometer.

In the preferred form of the invention, the series of chambers is carried in the forward end of the housing 18 with the magnet 36 normally releasably locked over the chambers. To this end, the housing 18 comprises a thin strip of rigid plastic material of a nontoxic nature having a rectangular opening 41 at its forward end for receiving the chambers. Along the inner face of the rectangular opening is a channel 42 for receiving marginal edges of the series of chambers, as illustrated. The housing also includes aligned top slots 43 and 44 in the right and left sides of the housing around the opening 41 for tightly receiving the ends of the magnet 36 and releasably holding the magnet in place over the chambers.

While a particular disposable thermometer structure has been described in detail herein, it is appreciated that changes and modifications may be made in the illustrated form without departing from the spirit of the invention. It is therefore intended that the present invention be limited in scope only by the terms of the following claims.

I claim:
1. A thermometer comprising:
   a series of separate sealed chambers each including a transparent face for viewing the interior of said chamber;
   a temperature-sensitive material in each chamber adapted to change from a solid to a liquid state when exposed to heat above a different predetermined temperature; and
   a quantity of magnetized metal particles suspended in each temperature-sensitive material, the particles in each chamber initially being poled in a common direction along different substantially parallel lines to rapidly repel each other and move from parallel alignment as the temperature-sensitive material in which they are suspended begins to change to a liquid state thereby providing an accurate visual indication that said thermometer has been exposed to heat above the predetermined temperature associated with the temperature-sensitive material.

2. The thermometer of claim 1 further including an elongated hand-holdable housing including a thin, flat end portion of nontoxic material adapted to be inserted into the human mouth and carrying said series of sealed chambers at said end portion.

3. The thermometer of claim 2 further including a magnet secured to said housing over said chambers to maintain parallel alignment of said metal particles, said magnet being removable from said housing prior to insertion of said end portion into the mouth.

4. The thermometer of claim 2 wherein said series of sealed chambers comprise upper and lower sheets of plastic material bonded along marginal edges and at spaced intervals to define said series of separate chambers, marginal edges of said sheets being supported by said end portion of said housing.

5. The thermometer of claim 1 wherein said temperature-sensitive materials comprise waxes of different composition and having different melting temperatures.

6. The thermometer of claim 5 wherein said waxes comprise a mixture of myristic acid and lauric acid.

7. The thermometer of claim 6 wherein said magnetized metal particles comprise particles of barium ferrite.

* * * * *